United States Patent [19]
Collin

[11] 3,778,036
[45] Dec. 11, 1973

[54] DEVICE FOR PLASTICIZING AND HOMOGENIZING VISCOUS MASSES

[76] Inventor: Heinrich Collin, Wilhelm-Meister-Str. 2, Munich, Germany

[22] Filed: Mar. 1, 1972

[21] Appl. No.: 230,796

[30] Foreign Application Priority Data
Mar. 3, 1971 Germany.............. P 21 10 179.1

[52] U.S. Cl................................. 259/185, 425/209
[51] Int. Cl............................................. B29b 1/06
[58] Field of Search.................... 425/200, 207, 209, 425/376, 381.2; 259/9, 10, 185, 190, DIG. 39; 100/156

[56] References Cited
UNITED STATES PATENTS
2,261,257  11/1941  Kiesskalt et al................ 259/185

FOREIGN PATENTS OR APPLICATIONS
106,771   3/1875   France........................... 100/156

Primary Examiner—Harvey C. Hornsby
Assistant Examiner—Alan I. Cantor
Attorney—Joseph Weingarten et al.

[57] ABSTRACT

A device for plasticizing and homogenizing viscous masses, especially plastics and rubber, in which processing of the material takes place between a rotating drum and a stationary semicylindrical trough partially surrounding the drum which, on the inner surface facing the drum, contains several mixing grooves each extending in a generally longitudinal direction along the inner surface of the trough structure and spaced circumferentially from each other. The grooves are interconnected by channels or slots so that they operate in a sequential manner cooperatively with the drum to properly mix the material introduced at the drum surface.

11 Claims, 5 Drawing Figures 3,778,036

DEVICE FOR PLASTICIZING AND HOMOGENIZING VISCOUS MASSES

FIELD OF THE INVENTION

This invention relates in general to mixing apparatus and more particularly concerns a novel device for plasticizing and homogenizing viscous masses, particularly materials such as plastics and rubber.

DISCUSSION OF THE PRIOR ART

A number of processes and machines for plasticizing synthetic resins and rubber and for forming flat shaped articles, and thus sheeting and plates, are known. In extrusion the material in a cylinder is plasticized using a rotating screw, and is then divided in a fishtail die and pressed into the desired width and thickness. In this case considerable difficulties arise in obtaining uniform material flow from the screw end to the quite different distant discharge points, which leads to such difficulties as the material being heated for unequal periods of time, to viscosity changes and to quality differences in the width of the sheeting or tape produced.

Relatively sensitive material, in particular polyvinylchloride (PVC), is processed on multiple drum calenders. These calenders are, however, very expensive and require much space. Drum extruders are also known in which only one drum rotates in a cylindrical housing and the plasticizing mass is conducted under pressure and with shearing action through the annular clearance formed by the drum and housing. The disadvantage in this case, however, is the long narrow flow paths, which easily lead to overheating of the material with simultaneous unsatisfactory blending.

Moreover, there are already devices known with a rotating drum and one or several V-shaped trays or troughs which plasticize the raw material and flatten it into a skin (West German Pat. Nos. 1,256,401 and 1,191,547). A device, according to West German Offenlegungsschrift Pat. No. 1,912,779, makes it possible to deliver raw material over the entire width of the drum and, in less than one rotation of the drum, to convey raw material tangential to the roller surface through several tandem, joined, single V-grooves in the direction of drum rotation, or mixing grooves worked into a tray with relatively narrow delivery V-grooves. A similar apparatus is described in West German Auslegeschrift Pat. No. 1,629,288.

All these V-groove arrangements have some significant disadvantages which derive from incomplete and unequal conducting and processing of the raw material. In the first slot of such a piece of equipment, the material is introduced between the rotating drum and the V-tray. In this manner, the material is pressed onto the roller and is drawn from the latter into a narrow part of the slot, with a shear zone being formed between the rotating drum and the stationary tray wall. Part of the material sticks to the drum; this material is, therefore, transported at the drum speed. The material near the tray, however, clings to the tray. Therefore, in an extreme case it stands still, or in any case, it travels along the tray at only a slow speed. Also in the case of passage of the material through the next V-slot, and so forth, no change in this stratification results. The material near the drum remains on the drum and is therefore conveyed through all slots; the material on the sides of the tray is somewhat mixed into the circulation flow which circulates in the further part of each V-groove. Here the material substantially remains circulating in place until it is carried away accidentally by inhomogeneities in the flow through the narrow slot and is thereby further transported.

The consequence of this formation of a two-layer flow is a quite considerable spread in the length of time that various particles of the material remain in the device. The particles clinging to the drum are transported basically with the drum speed and emerge after several seconds from the processing zone, assuming peripheral drum speeds usual in practice. They spend a very short time there and are not satisfactorily processed. The particles near the tray, which are still in the circulating flow, are drawn into the V-slots, circulate there for a very long time, around 5 to 10 minutes, until they are again exchanged, that is, brought near the drum and carried on. These considerable differences in the time the material is processed have as a consequence:

Layering of the material, since a thin, very swiftly-flowing layer is formed over an essentially slow-flowing layer with the risk of the layers as well as different colors fanning out;

Possibly too long a stay in the core of the circulation flow, which, in the case of sensitive substances can lead to thermal disintegration and combustion;

Increased costs for raw material in the case of addition of increased amounts of stabilizers;

Higher loss in the case of material exchange, since the old material lags behind for a long time;

Unsatisfactory mixing of the material near the wall.

SUMMARY OF THE INVENTION

The present invention is based on overcoming the disadvantages which have been described, as well as others of the known devices, which operate with a drum; that is, obtaining in an improved device of the initially-mentioned type a homogeneous, uniformly processed material without local overheating.

This is solved inventively by combining a semicylindrical trough structure and a rotating drum, the trough corresponding in its internal diameter to the external diameter of the drum which it partially surrounds, to move the material operated upon in the circumferential direction around the drum. The inner surface of the trough is formed with a plurality of mixing grooves, each extending in a generally longitudinal direction and spaced circumferentially from each other. The grooves are interconnected by shear channels and are thus operative in sequential manner cooperatively with the drum to plasticize and homogenize the material being operated upon. The grooves may extend axially or be inclined to the drum axis. In the trough surface adjacent to the drum, the narrow shear channels which are essentially oriented in a circumferential direction connect the mixing grooves together in a circumferential direction and are arranged staggered from groove to groove. These channels, together with the mixing grooves, form a network of material conducting channels alternating more or less circumferentially and then more or less axially. For the insertion of the raw material, a V-shaped insertion surface is provided, leading to the drum at the beginning of the trough structure which, in approaching the drum separates into single channels parallel to one another.

The mixing grooves can be simply formed into the trough in the axial direction.

According to a further basic concept of the invention, the mixing and conducting grooves, zig-zag shaped in the longitudinal direction, can also be formed into the trough, whereby respectively in the longitudinal direction, adjacent grooves are staggered around a half zig-zag spacing. In this manner, from the end of a flat shear groove outwards, the mass flow is conveyed forward right and left diagonally to the circumferential direction in order to be conducted again to a circumferential shear channel in the forward gap.

In some cases it is useful to work the mixing grooves into the trough only in a diagonal, and therefore coiling, direction. These grooves run out (into the trough surface) shortly before the end of material travel around the trough.

BRIEF DESCRIPTION OF THE DRAWING

The advantages, features and objects of the invention will become more apparent in light of the following description when taken in conjunction with the drawing, in which.

DESCRIPTION OF THE PREFERRED EMBODIMENTS

Figure 1:
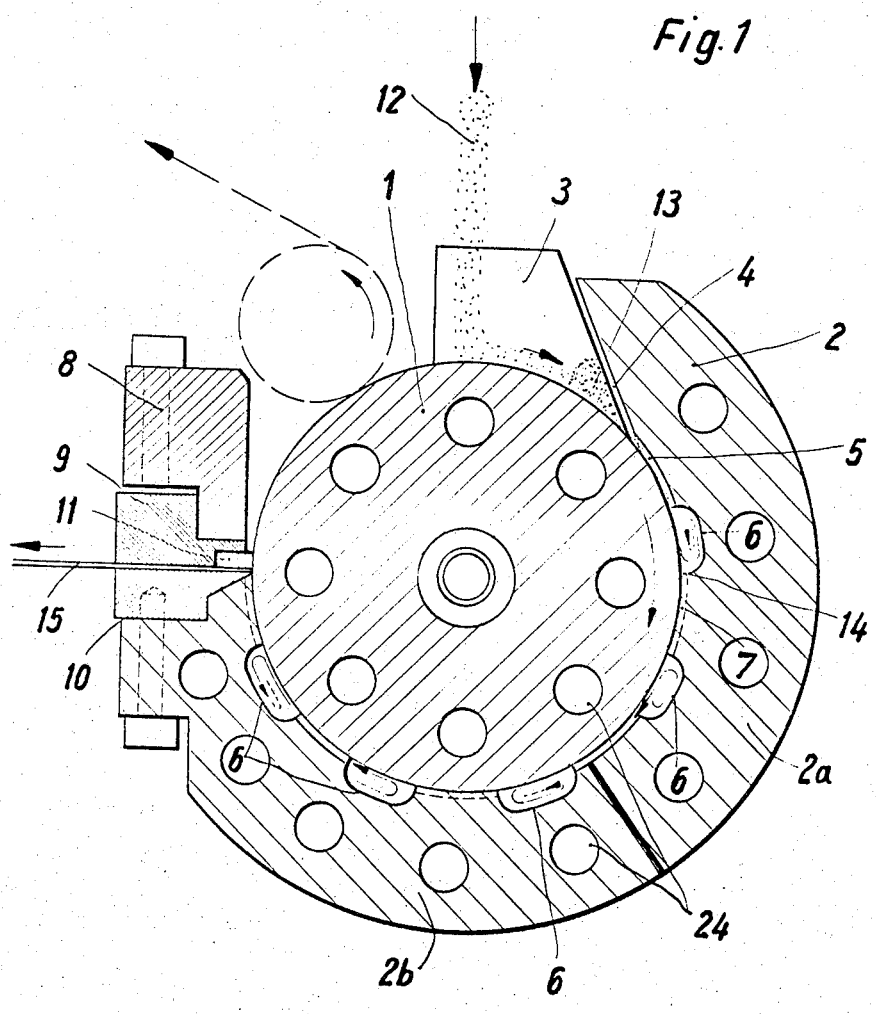
FIG. 1 is a cross-section through a device constructed in accordance with this invention.
Figure 2:
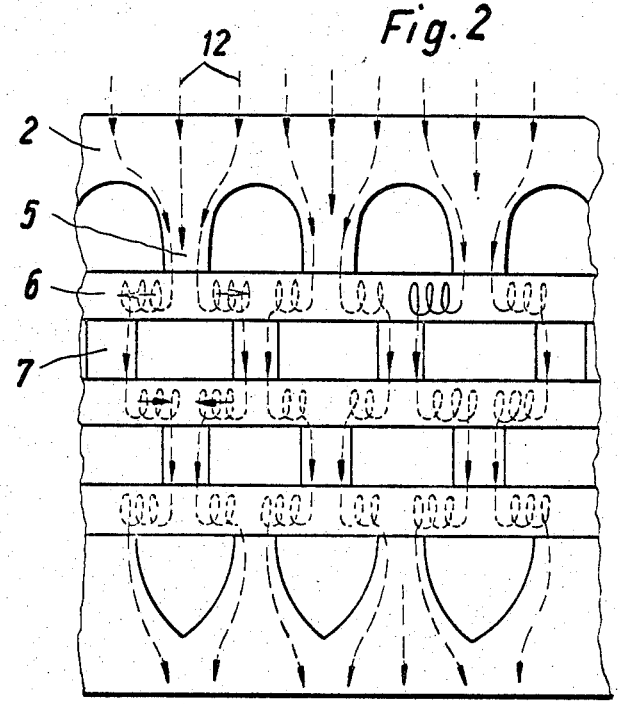
FIG. 2 is a view of the innerside of the trough.

FIG. 1 shows a cross-section through an embodiment of the machine of this invention. A driven drum 1 heated with fluid, steam or electricity and with controllable peripheral velocity is partially surrounded by an also heated and temperature-regulated trough 2. In the feeding area of the trough lateral boundary plates 3 are set up. The trough itself in the feeding part has first an insertion surface 4 set diagonally to the drum, turning into single parallel channels 5 which open out into a mixing groove 6. Shear channels 7 connect the first mixing groove to the second mixing groove. Similarly, grooves and the shear channels lying between them continue to the end of the trough, the shear channels being staggered from groove-to-groove as shown in FIG. 2. At the end of the trough there is a nozzle holder 8 for adjustable nozzle lips 9 and 10. Nozzle lip 10 holds a stripper 11 against the side of the drum.

Channels 24 in drum 1 and trough 2 serve for conducting the heating medium.

The distance between the rotating drum surface and the non-worn passages of the trough amounts to about 0.01mm. It is just large enough that friction wear does not occur between drum and trough, and is narrow enough to strip off the greatest part of the mass, leaving material 12 from a preceding shear channel onto the opposite stripping edge 14 of the next mixing groove, thereby forcing it into the mixing flow.

The device works in the following manner:

Raw material 12 is spread over the entire length of drum 1, laterally constricted by the boundary plates 3. It is drawn from drum 1 into the feeding slot 13 between the drum and the feeding surface 4 of the tray and is separated further on in this slot into single parallel conducting flows in the shear channels 5 (see FIG. 2). In passing through the channels 5 shear energy depending upon the depth of the shear channel and the peripheral velocity of the drum is introduced into the material, which leads to an increase in the temperature and separation of the larger granules or agglomerates. The material thus processed then goes into the mixing groove 6, the back side 14 of which operates as a stripping edge. The heated material from the drum scrapes off and is now carried on in the groove in a screw-like mixing motion in an axial direction relative to the drum. A levelling of the temperature and homogeneous intermingling of all particles then takes place. After a certain axial transportation the material is further conveyed through the conducting shear channel 7, which is offset in the axial direction, to the next mixing groove 6 with a renewal application of shear and heat energy. At the end of the trough the plasticized material from stripper 11 is forced into the slot between nozzle lips 9 and 10 radially to drum 1 and is finally extruded as a sheet or plate 15.

FIG. 2 shows the flow of the material in the recesses of trough 2, forming a network in a view of the inner side of the trough. Arrows show the flow of the material. The figure clearly shows the forced conveyance of the material 12 through the system of narrow shear channels 5, running in the circumferential direction, the division into two oppositely directed axial mixing and conveying flows in the grooves 6 and again the conducting into the shear channels 7, which are displaced with respect to the shear channels 5 in the axial direction.

Figure 3:
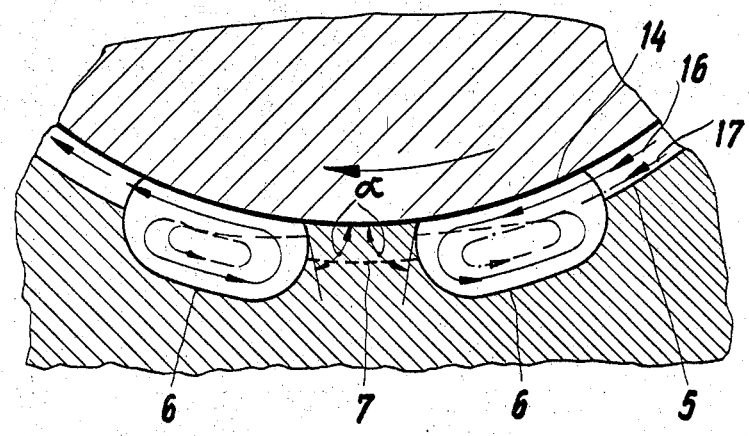
FIG. 3 shows an enlarged section of the trough cross-section.

FIG. 3 shows an enlarged section of the trough shown in FIG. 1. It is here made clear that all material, both that material 16 immediately adjacent to the drum as well as the material 17 flowing along the trough is forced by stripping edge 14 of the mixing and conveying groove 6, to be stripped off and carried axially through the mixing groove (perpendicular to the plane of the drawing) with a circular mixing motion.

Figure 4:
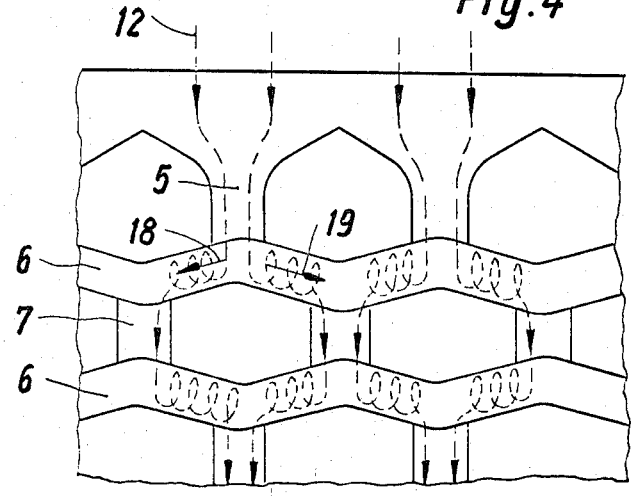
FIG. 4 is a variant of the slot pattern with zig-zag shaped grooves.

FIG. 4 shows the view on the inner side of the trough with a variant of the groove pattern in such a way that the mixing grooves 6 are formed not axially parallel, but zig-zag shaped in the trough, in which, in this case, the next following groove is offset longitudinally by about half a zig-zag spacing. The material 12 is conducted through the shear channel 5 to groove 6. There it is divided into two conveying flows 18 and 19, which pass diagonally in the general direction of the drum axis.

Figure 5:
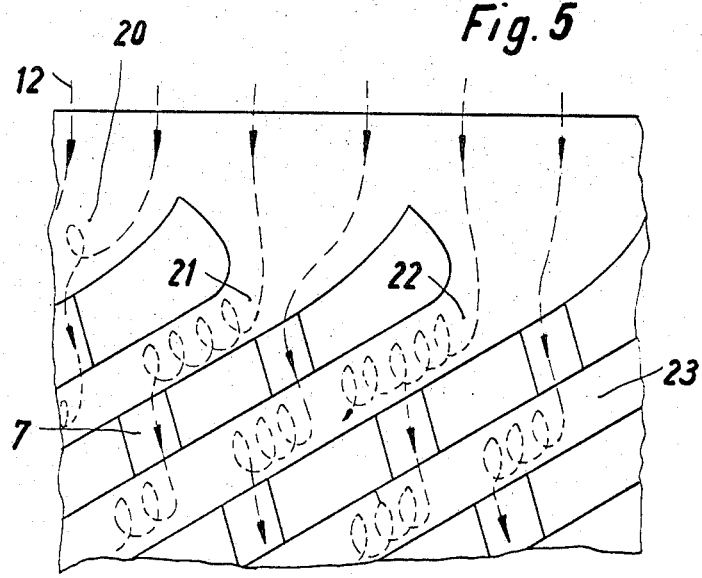
FIG. 5 shows another variant of the slot pattern with unidirectionally running slots arranged diagonally to the axis of the drum.

FIG. 5 shows a further possible embodiment of the construction of the mixing grooves. In this case, there are only mixing grooves 20 to 23 oriented diagonally to the drum axis. The raw material 12 is directly introduced here into the grooves 20 to 23 and from these conducted through the conducting shear channels 7, as in the case of the embodiment according to FIGS. 1 to 3, with application of the shear energy in the groove following in the circumferential direction. The grooves stop shortly before the material reaches the end of its travel around the trough.

The mixing grooves preferably constitute in cross-section semi-circular or substantially right-angled channels with a carefully rounded shape in the bottom of the groove and with sharp edges on the transition to the trough surface. The angle, $\alpha$ (FIG. 3), between the side of the groove and the surface of the trough, is preferably 90° or less.

The number of grooves on the circumference of the trough may be arbitrarily chosen, but should be preferably, between 5 and 15. The cross-sectional area of the grooves may be constant or, preferably get successively smaller in the direction of the drum rotation.

The shear channels formed in the passages separating the mixing grooves exhibit depths of around 2 to 0.2mm; these depths preferably decrease in the circumferential direction approaching the end of material travel.

For production of single strands, instead of a large sheet, single openings through the nozzle can also be provided.

In case the trough encompases more than one-fourth the drum circumference, it is advisable to make it in two pieces (2a and 2b), both halves of the trough being arranged around a common axis so that a suitable opening of the trough is possible for cleaning purposes, but with the closing of which, however, a completely solid inner surface results. Arcuate halves 2a and 2b may be connected together by any suitable means about an axis common with the axis of drum 1.

In order to facilitate conveyance of the material into the feeding slot it is useful to set up a driven feeding drum at that point. In this way a stripper is provided at the beginning of the trough, which fits directly on the feeding drum and returns the raw material completely into the slot.

For further improvement of the quality of the manufactured product, a closed space can be made over the drum and trough, which can be evacuated and into which the raw material is introduced through corresponding vacuum-tight charging valves or through superposed extruders.

The advantages obtained with this invention are that it is now possible to process the entire mixed material equally and carefully. All particles of the material are exposed to about the same stress through energy supplied from shearing and heat transfer in the narrow circumferential shear slots as well as uniform mixing with longitudinal movement in the mixing grooves. Therefore, a very small distribution in material processing times is obtained. The consequence of this uniform processing is a very homogeneous end product with equal properties over the width and thickness of a sheet of the material extruded at the outlet of the apparatus.

Through intensive mixing layering is safely avoided.

By means of compulsory and not-accidental conveying of the material through the mixing and shearing zones a complete exchange of material is secured in a short time. The danger of the material residing in dead zones and of too long a stay with the danger of combustion is thus no longer present.

The pressures arising can be very simply determined by installation of shear planes of the shear channels against the drum, therefore either shear planes parallel to the drum surface, whereby only a pure drag stream appears, or a slightly V-shaped one begins, which causes considerably higher hydrodynamic pressures. The possibility of setting relatively low working pressures allows for simple construction of very wide machines for making very wide sheets or plates.

With the present invention a simple device for plasticizing and homogenizing viscous masses is created, in particular in connection with the production of sheets or plates, which makes possible quite uniform and careful processing and thereby the production of a very uniform product. Modifications and alternatives will likely occur to those skilled in this art which are within the scope of this invention.

What is claimed is:

1. A device for plasticizing and homogenizing viscous masses comprising:
   a cylindrical drum rotatable about its longitudinal axis;
   a stationary semi-cylindrical trough partially surrounding said drum, the inner diameter of said trough substantially corresponding to the external diameter of said drum, the inner surface of said trough being formed with a plurality of mixing grooves each extending in a generally longitudinal direction and spaced circumferentially from each other, said grooves being interconnected by a plurality of shear channels oriented in a substantially circumferential direction, said shear channels being staggered in the longitudinal direction from groove to groove, said mixing grooves and shear channels forming a network of alternating more or less circumferentially and then more or less longitudinally oriented material conducting channels.

2. The device according to claim 1, wherein a V-shaped conducting insertion area is formed at the entrance to said trough between said trough and said drum, said insertion area is divided in the approach to the first of said mixing grooves into single channels parallel to each other, oriented essentially circumferentially.

3. The device according to claim 1, wherein said mixing grooves are formed in said trough in the axial direction.

4. The device according to claim 1, wherein said mixing grooves form a zig-zag pattern in the generally longitudinal direction in the trough and adjacent grooves are staggered in the longitudinal direction by approximately half a zig-zag spacing.

5. The device according to claim 1, wherein said mixing grooves are parallel and are formed in the trough inclined to the axial direction.

6. The device according to claim 1, wherein said mixing grooves are formed as semi-circular cross-sectional channels with carefully rounded shape in the bottom of the grooves and with sharp edges at the transition to the trough surface, the angle between the sides of the grooves at the transition and the trough surface forming said sharp edges being not larger than 90°.

7. The device according to claim 6, wherein the cross-sectional areas of the mixing grooves become smaller in the direction of the drum rotation.

8. The device according to claim 1, wherein said shear channels formed in said trough between said grooves have decreasing depths from about 2 to 0.2mm in the direction of drum rotation.

9. The device according to claim 1, and further comprising a nozzle connected to the end of the trough for extruding the material in the radial direction.

10. The device according to claim 1, wherein said trough consists of two halves, which when spread out are maneuverable around a common axis and in the closed state present a completely solid or seamless inner contour.

11. The device according to claim 1 wherein said mixing grooves are formed as generally rectangular cross-sectional channels with carefully rounded corners in the bottom of the grooves and with sharp edges at the transition to the trough's surface, the angle between the sides of the grooves at the transition and the trough's surface forming said sharp edges being not larger than 90°.

* * * * *